3,350,346
STRESS CRACKING INHIBITOR
Orwin G. Maxson, Ponca City, Okla., assignor to Continental Oil Company, Ponca City, Okla., a corporation of Delaware
No Drawing. Filed May 25, 1965, Ser. No. 458,781
12 Claims. (Cl. 260—45.7)

ABSTRACT OF THE DISCLOSURE

Metal salts of alkaryl sulfonic acid are useful as inhibitors of stress cracking in ethylene homo- and copolymers. Preferred are the lithium, sodium, potassium, calcium, zinc, and aluminum salts wherein the alkaryl moiety contains an average of at least about 18 carbon atoms.

---

This invention relates to a method for inhibiting polymers against stress cracking, and to the resulting polymer. In one aspect, the invention relates to a composition comprising a major portion of ethylene polymer and a minor but effective portion of an oil soluble detergent containing a metal ion, and to a method of producing the same.

Polymers, and especially olefin polymers, have come to the fore in a large number of industrial and consumer uses. One serious problem that has plagued many of these uses has been that of stress cracking. Foremost among the offenders in stress cracking has been ethylene homopolymer and, to a lesser extent, copolymers and blends in which ethylene comprises the major portion. This is especially unfortunate in that these same polymers are in many other aspects superior materials. Stress cracking severity depends upon the environment to which the polymer is exposed, and for this reason stress cracking is often specified as being environmental stress cracking, or ESC. Among the more severe environments is household detergents, which means that household detergents, when packaged in polyethylene bottles, require use of a polymer of low melt index, with consequent fabrication difficulties. Although ESC has been cited here as being a problem in packaging, its bad effects are of course not limited to this field. The myriad plastic products which are available have this same drawback. For example, extruded insulation on electrical conductors, molded scrub buckets, boat seats, automobile parts, pipe, etc., can all become exposed to harmful environments during their normal usage.

It is accordingly an object of this invention to provide method and composition for reducing the sensitivity of plastics to ESC. It is another object of the invention to provide a composition comprising a major proportion of ethylene polymer, and a method of making same, which has improved resistance to ESC in a detergent environment.

I have discovered that ESC properties of ethylene homopolymers and copolymers and blends comprising a major proportion of ethylene can surprisingly be greatly improved by incorporating therein an additive which is itself a detergent, viz. an alkali or alkaline earth metal salt of an alkaryl sulfonate, as will be more fully defined.

Although the additive of this invention is effective in a wide variety of thermoplastics, the problem of ESC is prevalent primarily only in ethylene polymers. By ethylene polymers, I mean homopolymers of ethylene produced by the various known low and high pressure processes, and also copolymers comprising a major portion of ethylene and a minor portion of a monomer copolymerizable therewith, as well as blends comprising a major portion of polyethylene and a minor portion of a compatible polymer. Exemplary but not limiting copolymers are ethylene-propylene, ethylene-butene, ethylene-vinyl acetate, and the like. Suitable blends include blends of high- and low-pressure process polyethylenes, polyethylene-polypropylene, polyethylene-polybutene, polyethylene-polyvinyl acetate, and the like. Those plastics which are most susceptible to ESC, and the most benefited by my invention, can be generally characterized as being rigid, as opposed to rubbery, materials.

The additive of my invention can be described broadly as a metal salt of an alkaryl sulfonate, wherein the hydrocarbon portion is of sufficient molecular weight to provide an oil soluble salt. Such metal alkaryl sulfonates are known in the art as detergents, e.g. as detergent additives in automotive lubricating oil. I have discovered that these materials are surprisingly very effective in reducing ESC, especially in a detergent environment. The sulfonate salts are preferably neutral salts, i.e. the sulfonic acid groups present are reacted with approximately the stoichiometric amount of an oxide, hydroxide or other compound of the desired metal, although slightly overbased or under-based material is operable. Alkaryl sulfonates require an alkyl portion totalling about 18 carbon atoms in order to be oil soluble. To attain the requisite oil solubility, therefore, requires that the hydrocarbon portion of the sulfonate have a molecular weight between about 350 and 1,000. Preferably this molecular weight is between 400 and 700. Particularly useful sulfonates include postdodecylbenzene sulfonates, diwaxbenzene sulfonates, diwaxtoluene sulfonates, and poly nonyl naphthalene sulfonates. A particularly useful sulfonate for use in my invention, because of its availability and commercial importance, is the sulfonate obtained by neutralizing postdodecylbenzene sulfonic acid which in turn is obtained by the sulfonation of postdodecylbenzene. Postdodecylbenzene consists of monoalkylbenzenes and dialkylbenzenes in the approximate ratio of 2:3. Its typical properties are as follows:

| | |
|---|---|
| Specific gravity at 38° C. | 0.8649 |
| Average molecular weight | 385 |
| Percent sulfonatable | 88 |
| A.S.T.M., D–158 Engler: | |
|    I.B.P. | °F__ 647 |
|    5 | °F__ 682 |
|    50 | °F__ 715 |
|    90 | °F__ 760 |
|    95 | °F__ 775 |
|    F.B.P. | °F__ 779 |
| Refractive index at 23° C. | 1.4900 |
| Viscosity at: | |
|    −10° C. | centipoises__ 2800 |
|    20° C. | do____ 280 |
|    40° C. | do____ 78 |
|    80° C. | do____ 18 |
| Aniline point | °C__ 69 |
| Pour point | °F__ −25 |

Preparation of these compounds is well known in the lubricating art, and needs no further treatment here. Exemplary of suitable processes for producing the additives are U.S. Patent 2,861,951, Carlyle, issued Nov. 25, 1958, and pending U.S. Ser. No. 446,661, Feighner et al., filed Apr. 8, 1965, and entitled, "Sulfonatable Alkylate Compositions and Methods for Preparing Same." The metals which I prefer for the ESC additives comprise those in groups I–A, II–A, II–B, and III–B of the periodic table, and more preferably comprise lithium, sodium, potassium, magnesium, calcium, zinc and aluminum. In the case of the multivalent metals, especially aluminum, the additive sometimes takes the form, e.g. aluminum hydroxy di[(alkaryl)sulfonate].

I have also discovered that, in many instances, the additives of my invention have the benefit, in addition to improving detergent ESC properties, of raising the melt index of the molten material. That is, my additives act as internal flow lubricants in allowing melt fabrication with lower energy expenditures while producing little effect on the properties of the material in its solid state, in contrast to the effect of plasticizers. Also, the compounded products of my invention appear to be very little changed from the virgin material properties of ESC in oxidative and solvent environments; if anything, these properties appear to be slightly improved.

The additive is mostly simply incorporated in the polymer by milling or compounding. I have found that at least about 1 phr. additive is necessary to produce noticeable ESC improvement, and more preferably at least about 3 weight percent. I have incorporated up to about 10 weight percent and more of the additive, with little effect on the physical properties of the product. Other additives, such as fillers, dyes, pigments, and plasticizers can be incorporated, either along with my additives or separately, if desired.

Further understanding of the invention will be gained by consideration of the following examples, which are illustrative and not limiting.

*Example 1*

Polyethylene of 2 melt index and specific gravity of about 0.920 was blended in a Banbury to incorporate additive as shown. The homogeneous blend was then in each instance molded into test bars and tested for its ESC value. Where the environment was detergent (Igepal CO-630, nonylphenoxypoly(ethyleneoxy)ethanol), the test was run in accordance with ASTM D-1693-60T; in the air solvent environments, similar techniques were used.

| Sample | Additive, wt. percent | Additive Type* | Environment | Time to ESC Failure |
| --- | --- | --- | --- | --- |
| A | None (control) | None | Air | No failure. |
| A | ---do--- | ---do--- | Water | 33-72 hrs. |
| A | ---do--- | ---do--- | Detergent | 1 hr. 37 mins. |
| B | ½ | Calcium | ---do--- | 2 hr. 2 mins. |
| C | 1 | ---do--- | ---do--- | 3 hr. 5 mins. |
| D | 3 | ---do--- | ---do--- | 7-16 hrs. |
| E | 5 | ---do--- | Air | No failure. |
| E | 5 | ---do--- | Water | 33-72 hrs. |
| E | 5 | ---do--- | Detergent | 168 hrs. |
| F | 10 | ---do--- | ---do--- | No failure. |

*The neutral calcium salt of a post-dodecylbenzene sulfonate wherein the alkyl groups derive from a propylene polymer; average molecular weight of the alkylate about 900.

At the 5% additive level, elongation is virtually unchanged from the virgin material value of about 130%, and tensile strength is about 5 percent lower than the virgin material value of about 2850 p.s.i.

*Example 2*

Additives were incorporated into the same type polyethylene as used in Example 1, and the resulting compositions were tested in the same manner.

| Sample | Additive, wt. percent | Additive Type* | Environment | Time to ESC Failure |
| --- | --- | --- | --- | --- |
| G | None (control) | None | Detergent | 2 hrs. 7 mins. |
| H | 1 | Mg | ---do--- | 5 hrs. 2 mins. |
| J | 5 | Al hydroxy | ---do--- | 32-72 hrs. |
| K | 5 | Ca | ---do--- | 32-72 hrs. |
| L | 5 | Mg | ---do--- | 552 hrs. |
| M | 5 | Mg | Toluene | 24 hrs. |
| N | None (control) | None | ---do--- | 27 hrs. |
| O | 5 | Mg | Mixed chloroethanes. | 24 hrs. |
| P | None (control) | None | ---do--- | 24 hrs. |

*The neutral metal salt of an alkaryl sulfonate produced by the method of copending U.S. Serial 446,661.

Melt index of Sample L was determined to be about 3.5.

*Example 3*

Polyethylene of 7 melt index was evaluated with various additives in the same manner as in Examples 1 and 2.

| Sample | Additive, wt. percent | Additive Type* | Environment | Time to ESC Failure |
| --- | --- | --- | --- | --- |
| R | None (control) | None | Detergent | 30 mins. |
| S | 5 | Al hydroxy | ---do--- | 1 hr. 5 mins. |
| T | 5 | Ca | ---do--- | 52 mins. |
| U | 5 | Mg | ---do--- | 1 hr. 5 mins. |
| V | 10 | Mg | ---do--- | 1 hr. 38 mins. |

*Neutral metal salt of same type sulfonate as in Example 2.

Melt index of Sample U was determined to be about 12.

*Example 4*

Various polymer blends and copolymers are tested in the manner of the preceding examples, using various additives. Polymers tested include a copolymer of about 97 weight percent ethylene and the balance propylene, a copolymer of about 96 weight percent ethylene and the balance vinyl acetate, a blend of about equal parts by weight of a high pressure process polyethylene and a low pressure process polyethylene, and a blend of about 98 weight percent polyethylene and the balance polyproylene. Additives tested include the lithium, sodium, potassium and zinc salts of alkaryl sulfonates prepared by the footnote methods of Examples 1 and 2. Improvements in ESC properties similar to those of the preceding examples are obtained.

Having thus described the invention by providing specific examples thereof, it is to be understood that no undue limitations or restrictions are to be drawn by reason thereof and that many variations and modifications are within the scope of the invention.

1. A composition comprising a thermoplastic polymer derived from monomers of which the major proportion by weight is ethylene and, homogeneously blended therein, a stress cracking inhibiting amount of an alkaryl sulfonate metal salt wherein the metal is selected from the group consisting of lithium, sodium, potassium, calcium, magnesium, zinc, and aluminum.

2. The composition of claim 1 wherein said metal is calcium.

3. The composition of claim 1 wherein said metal is zinc.

4. A composition comprising a thermoplastic polymer derived from monomers of which the major proportion by weight is ethylene and, homogeneously blended therein, at least about one weight percent based on said polymer of an alkaryl sulfonate metal salt wherein the metal is selected from the group consisting of lithium, sodium, potassium, calcium, magnesium, zinc, and aluminum.

5. The composition of claim 4 wherein said alkaryl moiety comprises the alkylation product of a straight chain alkyl halide and an aromatic hydrocarbon of at most two rings, and contains an average of at least about 18 carbon atoms.

6. The composition of claim 5 wherein said metal is magnesium.

7. The composition of claim 5 wherein said metal is calcium.

8. The composition of claim 5 wherein said metal is zinc.

9. The composition of claim 4 wherein said alkaryl moiety comprises the alkylation product of a propylene polymer and an aromatic hydrocarbon of at most two rings, and contains an average of at least about 18 carbon atoms.

10. The composition of claim 9 wherein said metal is magnesium.

11. The composition of claim 9 wherein said metal is calcium.

12. The composition of claim 9 wherein said metal is zinc.

References Cited

UNITED STATES PATENTS 3,067,151  12/1962  Terry et al. _____ 260—2.5
3,146,216  8/1964  Salgado et al. ____ 260—45.4

DONALD E. CZAJA, *Primary Examiner.*

V. HOKE, *Assistant Examiner.*